(12) United States Patent
Storm et al.

(10) Patent No.: US 11,828,638 B2
(45) Date of Patent: Nov. 28, 2023

(54) METHOD FOR OPERATING A CORIOLIS MASS FLOWMETER AND CORRESPONDING CORIOLIS MASS FLOWMETER

(71) Applicant: KROHNE Messtechnik GmbH, Duisburg (DE)

(72) Inventors: Ralf Storm, Essen (DE); Johannes Kunze, Mülheim (DE); Volker Stegemann, Bochum (DE); Alexander Erkelenz, Duisburg (DE)

(*) Notice: Subject to any disclaimer, the term of this patent is extended or adjusted under 35 U.S.C. 154(b) by 2 days.

(21) Appl. No.: 17/660,936

(22) Filed: Apr. 27, 2022

(65) Prior Publication Data
US 2022/0381598 A1   Dec. 1, 2022

(30) Foreign Application Priority Data

May 26, 2021  (DE) ...................... 10 2021 113 609.1
Jun. 28, 2021  (DE) ...................... 10 2021 116 633.0

(51) Int. Cl.
*G01F 1/84*   (2006.01)

(52) U.S. Cl.
CPC ............ *G01F 1/8436* (2013.01); *G01F 1/845* (2013.01); *G01F 1/8422* (2013.01); *G01F 1/8427* (2013.01); *G01F 1/8431* (2013.01)

(58) Field of Classification Search
CPC ............................ G01F 1/8431; G01F 1/8436
See application file for complete search history.

(56) References Cited

U.S. PATENT DOCUMENTS

| | | | | |
|---|---|---|---|---|
| 5,469,748 | A | * | 11/1995 | Kalotay ............... G01F 1/8413 73/861.356 |
| 6,505,131 | B1 | | 1/2003 | Henrot |
| 7,469,600 | B2 | | 12/2008 | Matt et al. |
| 2008/0156108 | A1 | | 7/2008 | Matt et al. |
| 2013/0141262 | A1 | | 6/2013 | Hays et al. |

FOREIGN PATENT DOCUMENTS

| | | |
|---|---|---|
| DE | 4323028 A1 | 1/1995 |
| DE | 102004055553 A1 | 5/2006 |
| EP | 902262 A2 | 3/1999 |

* cited by examiner

*Primary Examiner* — Erika J. Villalu Na
(74) *Attorney, Agent, or Firm* — Patrick D. Duplessis

(57) ABSTRACT

A method for operating a Coriolis mass flowmeter includes: calculating error-free oscillation signal phase differences using a first measuring channel pair with a first measuring channel phase difference; calculating averaged error-containing oscillation signal phase differences using a second measuring channel pair with a second measuring channel phase difference; determining error-containing oscillation signal phase differences using a third measuring channel pair with negligible measuring channel phase difference; determining the second measuring channel phase difference by difference formation from the averaged error-containing oscillation signal phase differences of the second measuring channel pair and the error-free oscillation signal phase differences of the first measuring channel pair; obtaining error-free oscillation signal phase differences by subtracting the determined second measuring channel phase difference from the error-containing oscillation signal phase differences of the third measuring channel pair; and using the error-free oscillation signal phase differences for determining the mass flow rate.

20 Claims, 3 Drawing Sheets

METHOD FOR OPERATING A CORIOLIS MASS FLOWMETER AND CORRESPONDING CORIOLIS MASS FLOWMETER

TECHNICAL FIELD

The invention relates to a method for operating a Coriolis mass flowmeter, wherein the Coriolis mass flowmeter has at least one measuring tube, at least one oscillation generator, at least two oscillation sensors and at least one control and evaluation unit, wherein it is possible for a medium to flow through the measuring tube, wherein the oscillation generator excites the measuring tube into an oscillation at an excitation frequency, wherein the first and the second oscillation sensors capture the oscillations of the measuring tube on the inlet side and on the outlet side and provide them as a first oscillation signal with a first oscillation signal phase position and as a second oscillation signal with a second oscillation signal phase position, wherein the control and evaluation unit determines an oscillation signal phase difference between the first oscillation signal and the second oscillation signal and determines a mass flow rate from the oscillation signal phase difference. The invention also relates to a Coriolis mass flowmeter that carries out such a method.

BACKGROUND

Coriolis mass flowmeters have been known in the prior art for decades. Using the Coriolis effect, the mass flow rate of a fluid through the measuring tube is determined. For this, the measuring tube through which the fluid flows is excited to oscillation by at least one oscillation generator, as described at the beginning. The oscillation of the measuring tube is captured on the inlet and outlet side, as seen in the direction of flow, by oscillation sensors that are operatively connected to the measuring tube. Without flow, the captured oscillations of the two oscillation sensors are in phase in the theoretical ideal case. In the case of a mass flow, a differently directed Coriolis force results on the inlet and outlet sides, which leads to a phase shift between the deflections and thus the two captured oscillations of the oscillation sensors. Therefore, in this case, there is also a oscillation signal phase difference between the oscillation signals of the oscillation sensors. The phase shift is proportional to the mass flow within the measuring tube, it is therefore evaluated and a mass flow is determined from it.

The first oscillation signal and second oscillation signal provided by the first oscillation sensor and the second oscillation sensor each pass through a separate measuring channel as a result of their processing, which usually has analog and digital signal processing components. For example, the oscillation signals undergo analog amplification, impedance converting, analog/digital converting, low pass filtering, phase detection, etc. For quite different reasons, the propagation time of the first oscillation signal through one measuring channel and the propagation time of the second oscillation signal through the second measuring channel differ from each other, for example due to component differences, different thermal dependencies, different aging processes, etc. The pair of measuring channels formed by the two measuring channels consequently has an inherent measuring channel phase difference, which, after passing through the pair of measuring channels, leads to the finally determined oscillation signal phase difference being subject to error, i.e. it has a phase error in the magnitude of the measuring channel phase difference. This inevitably leads to a measurement error due to the aforementioned direct correlation between oscillation signal phase difference and mass flow rate.

It is known from DE 43 23 028 A1 to carry out switching of the measuring channels after the oscillation sensors, so that the oscillation signals supplied by the two different oscillation sensors run alternately over one and then over the other measuring channel of the measuring channel pair and the parasitic measuring channel phase difference therefore falsifies the oscillation signal phase difference with alternating signs, so that the error can be averaged out. However, the method has disadvantages, such as transients interspersed in the oscillation signals due to switching. Furthermore, disadvantageous boundary conditions become effective for the operation of downstream filters. For example, there is a dependency between the switching frequency between the channels of the measuring channel pair and the selection of the downstream filter and especially the filter length. The selection of the switching frequency has an effect on the measurement rate, i.e. the rate at which measurement data is output from the Coriolis mass flowmeter. This can manifest itself, for example, in a significantly lower output rate for determined measured values (sub-sampling).

In DE 10 2004 055 553 A1 and US 2013/0141262 A1, a switching of measuring channels is also used to compensate for undesirable phase errors in Coriolis mass flowmeters.

SUMMARY

It is thus the object of the present invention to design and further develop the aforementioned method for operating a Coriolis mass flowmeter and the associated Coriolis mass flowmeter in such a way that the aforementioned disadvantages are largely avoided. The derived object is initially achieved in the aforementioned method in that, by means of a first measuring channel pair with a first measuring channel phase difference from the oscillation signals by channel switching, analog/digital conversion, phase detection, digital low-pass filtering with downsampling effected thereby with a first conversion factor and averaging, error-free oscillation signal phase differences are calculated without contained phase errors due to an averaged-out first measuring channel phase difference. It should be noted here that these error-free oscillation signal phase differences from the first measuring channel pair are not used directly to calculate a mass flow rate. Furthermore, due to the similar implementation as described with respect to the prior art, the measurement using this first measuring channel pair has comparable disadvantages as just described in the prior art.

Furthermore, by means of a second measuring channel pair with a second measuring channel phase difference from the oscillation signals by analog/digital conversion, phase detection, digital low-pass filtering with downsampling effected thereby with a second conversion factor and averaging, averaged error-containing oscillation signal phase differences with contained phase error in the form of the second measuring channel phase difference are calculated. In contrast to the signal processing in the first measuring channel pair, the second measuring channel pair thus lacks channel switching, which is why the obtained oscillation signal phase differences contain errors, namely to the extent of the second measuring channel phase difference.

Furthermore, by means of a third measuring channel pair with negligible measuring channel phase difference, the oscillation signal phase positions of the second measuring channel pair measured after phase detection in the second measuring channel pair are captured, and either through continuous low-pass filtering without downsampling or through low-pass filtering with downsampling with a third conversion factor, where the third conversion factor is smaller or larger than the first conversion factor and the second conversion factor, error-containing oscillation signal phase differences with contained phase error due to the second measuring channel phase difference are determined. By "negligible" measuring channel phase difference is meant that the phase error of the third measuring channel pair is so small that it is not an obstacle to achieving the desired measurement accuracy, because the phase error of the third measuring channel pair is not separately treated or compensated for within the scope of the teachings presented herein. If it is taken into account that the third measuring channel pair only accounts for a fraction of the signal processing of the first measuring channel pair and the second measuring channel pair, then it is readily plausible that only an extremely small measuring channel phase difference, if any, is inherent in the third measuring channel pair. With "continuous low pass filtering" is meant that for the calculation of the current low pass filtered value a certain number of past values is always used, and for each newly received sample value also a low pass filtered value is always calculated. It is thereby recognizable that downsampling has no part. "Low pass filtering with downsampling" means that for the computation of a low pass filtered value likewise a certain number of past sample values is always used, however a low pass filtered value i not also calculated for each newly obtained sample value. This clearly results in a downsampling. In the purest form of this method, for example, n past samples are used to calculate a low-pass filter value, and each calculation of a new low-pass filter value is carried out with n new—i.e., previously unused—samples, so that downsampling by a factor of n results.

What is important at this point is the fact that the third conversion factor is smaller or larger than the first and second conversion factors. Thus it is established that oscillation signal phase differences are output over the third measuring channel pair, which has only a negligible measuring channel phase difference, with a higher or lower data rate (error-containing), than oscillation signal phase differences (error-containing and error free) resulting from the first and the second measuring channel pair are output.

By forming differences from the averaged error-containing oscillation signal phase differences with contained phase error of the second measuring channel pair and the error-free oscillation signal phase differences without contained phase error of the first measuring channel pair, the second measuring channel phase difference is determined, i.e. the phase error associated with the second measuring channel pair. In relation to the third measuring channel pair, the current measuring channel phase difference of the second measuring channel pair is determined with a lower data rate due to the conversion factors selected as above. This is not problematic, however, since the measuring channel phase difference is usually variable at a considerably slower rate than the flow measurement values of interest can be variable.

Finally, the determined second measuring channel phase difference is subtracted from the error-containing oscillation signal phase differences of the third measuring channel pair, and thus error-free oscillation signal phase differences without contained phase errors are obtained and used as a basis for determining the mass flow rate.

The different measuring channel pairs with the differently selectable conversion factors thus make it possible that the data rate of the measured value output can be implemented independently of the rate at which, for example, the second measuring channel phase difference is determined (which in turn is dependent on the switching frequency between the measuring channels of the first measuring channel pair). The disadvantages from the prior art described at the beginning are thereby overcome. If the third conversion factor is selected smaller than the first and the second conversion factor, it is possible, by—comparatively slow—determination of the measuring channel phase difference, i.e. the phase error caused by the characteristics of the measuring channel, of the second measuring channel pair, and by—comparatively fast —determination of an error-containing oscillation signal phase difference, which comprises the measuring channel phase difference of the second measuring channel pair, by means of the third measuring channel pair, to provide error-free oscillation signal phase differences and thus flow measurement values without quality losses in the error correction with high data rate. If the third conversion factor is chosen larger than the first and the second conversion factor, it is possible to handle unsteady measurement situations better, because a better smoothing is achieved via a larger filter length. It is readily possible to change the third conversion factor as needed during operation of the Coriolis mass flowmeter, so that it is possible to respond to different measurement situations during operation.

According to an advantageous design of the method, it is provided that the determination of the error-free oscillation signal phase differences by means of the first measuring channel pair is implemented in such a way that the oscillation signals are processed by means of the first measuring channel pair with a first measuring channel and a second measuring channel and with a first measuring channel phase difference between the first measuring channel and the second measuring channel, wherein the first oscillation signal and the second oscillation signal in the first measuring channel pair are routed on the input side alternately via the first measuring channel and the second measuring channel by means of a first channel switch. The oscillation signals are either sampled downstream of the channel switch by at least one analog/digital converter at a first sampling rate, and the sampled oscillation signals are fed back to their original measuring channel by a second channel switch, or the oscillation signals are routed downstream of the channel switch to their original measuring channel by a second channel switch and then sampled by at least one analog/digital converter at a first sampling rate. Between the channel switchers, of course, there may be other elements for signal processing, such as signal amplifiers. Then, at least one phase detector is used to determine first measured oscillation signal phase positions from the sampled first oscillation signals and to determine second measured oscillation signal phase positions from the sampled second oscillation signals. From a plurality of the first and second measured oscillation signal phase positions obtained in a respective position of the channel changeover switches, a low-pass filtered first oscillation signal phase position and a low-pass filtered second oscillation signal phase position are determined by at least one digital filter with low-pass characteristic, so that downsampling is thus effected with the first conversion factor in the first measuring channel pair. From temporally corresponding low-pass filtered oscillation signal phase positions in each case in one position of the channel switch, corresponding error-containing oscillation signal phase differences with contained phase error are determined on the basis of the first measuring channel phase difference. By averaging, error-free oscillation signal phase differences without contained phase error are then determined from several error-containing oscillation signal phase differences with contained phase error.

A further preferred design of the method is characterized in that the determination of the averaged error-containing oscillation signal phase differences by means of the second measuring channel pair is implemented in that the oscillation signals are processed by means of the second measuring channel pair with a first measuring channel and a second measuring channel and with a second measuring channel phase difference between the first measuring channel and the second measuring channel, wherein the first oscillation signal and the second oscillation signal are sampled by at least one analog/digital converter with a first sampling rate and first measured oscillation signal phase positions are determined with at least one phase detector from the sampled first oscillation signals and second measured oscillation signal phase positions are determined from the sampled second oscillation signals. From a plurality of the first and second measured oscillatory signal phase positions obtained in the second measuring channel pair during a position of the channel switches of the first measuring channel pair, a low-pass filtered first oscillation signal phase position and a low-pass filtered second oscillation signal phase position are determined by at least one digital filter with low-pass characteristic, so that downsampling is thus effected with the second conversion factor in the second measuring channel. From temporally corresponding low-pass filtered oscillation signal phase positions, corresponding error-containing oscillation signal phase differences with contained phase error are determined due to the second measuring channel phase difference, because there is no channel switching in the second measuring channel pair as in the first measuring channel pair. By averaging several error-containing oscillation signal phase differences with contained phase error, averaged error-containing oscillation signal phase differences with contained phase error are calculated on the basis of the second measuring channel phase difference.

According to a another further development of the method, it is provided that the determination of the error-containing oscillation signal phase differences by means of the third measuring channel pair is implemented in such a way, that by means of the third measuring channel pair with negligible measuring channel phase difference, low-pass filtered first oscillation signal phase positions and low-pass filtered second oscillation signal phase positions are determined from the first measured oscillation signal phase positions of the first measuring channel pair and from the second measured oscillation signal phase positions of the second measuring channel pair either by means of a continuous digital filter with low-pass characteristic, without downsampling being effected in the third measuring channel pair, or that by low-pass filtering with downsampling with a third conversion factor, wherein the third conversion factor is smaller or larger than the first conversion factor and the second conversion factor, low-pass-filtered first oscillation signal phase positions and low-pass-filtered second oscillation signal phase positions are determined, and from temporally corresponding low-pass-filtered oscillation signal phase positions corresponding error-containing oscillation signal phase differences with contained phase error are determined on the basis of the second measuring channel phase difference.

In a further preferred design of the method, the first conversion factor and the second conversion factor are selected in an integer ratio to each other, preferably they are selected identically, which in particular benefits the use of identical circuit components.

A further advantageous design of the method is characterized in that the switching frequency of the channel switch of the first measuring channel pair and the excitation frequency of the oscillation generator are matched to one another in such a way that at least one measuring tube oscillation is captured during the duration of one position of the channel switch, preferably a plurality of measuring tube oscillations are captured, particularly preferably between 4 and 12 measuring tube oscillations are captured. This design has the advantage that possible phase deviations can be compensated during a measuring tube oscillation, in particular with a constant flow rate.

Another advantageous further development of the method provides that the switching frequency of channel switching of the first measuring channel pair, the sampling rate of the analog/digital converter of the first measuring channel pair and/or of the second measuring channel pair and the length of the digital filters with low-pass characteristics of the first measuring channel pair and/or of the second measuring channel pair are matched to each other in such a way that the digital filter is substantially completely filled with samples from one position of the channel switch. Here, the advantageous effect is that the influence of transients caused by the switchover is reduced. In a preferred design, moreover, the samples of the analog/digital converters of the first pair of measuring channels and/or of the second pair of measuring channels are not used in the digital filters with low-pass characteristics of the first pair of measuring channels and/or of the second pair of measuring channels in the region of the switching times of the channel switch, whereby the influence of transients in the switching times is further displaced. In a specific further design of the method, the samples of the analog/digital converters of the first measuring channel pair and/or of the second measuring channel pair are replaced by zeros in the area of the switchover times of the channel switch in the digital filters with low-pass characteristics of the first measuring channel pair and/or of the second measuring channel pair, whereby transition effects in switchover times are practically overwritten.

In a further advantageous design of the method, a further digital filter is downstream of the digital filters with low-pass characteristics in the third measuring channel pair to implement downsampling, in particular where the downsampling is selected in such a way that the subsequent calculation of the error-containing oscillation signal phase differences and the error-free oscillation signal phase differences can be carried out with each pair of values of low-pass-filtered oscillation signal phase positions provided after the downsampling. In this case, the calculation resources are used in the best possible way. As much data as possible is used for low-pass filtering, which optimizes the smoothing result. However, only so much data is low-pass filtered that the resulting reduction in the data rate at the output of the low-pass filter is only so great that subsequent calculation resources, for example for floating-point operations, are just sufficient to also use the information at the data rate provided and also to generate further output values at a corresponding data rate.

Preferably, it is implemented that the digital filter of the first measuring channel pair with low-pass characteristic and/or the digital filter of the second measuring channel pair with low-pass characteristic and/or the digital filter of the third measuring channel pair with low-pass characteristic are implemented as FIR filters (finite impulse response filters).

Furthermore, the invention also relates to a Coriolis mass flowmeter having at least one measuring tube, at least one oscillation generator, at least two oscillation sensors and at least one control and evaluation unit, wherein a medium can flow through the measuring tube, wherein the oscillation generator excites the measuring tube into a harmonic oscillation with an excitation frequency, wherein the first and the second oscillation sensor capture the oscillations of the measuring tube on the inlet side and on the outlet side and provide them as a first oscillation signal with a first oscillation signal phase position and as a second oscillation signal with a second oscillation signal phase position, wherein the control and evaluation unit determines an oscillation signal phase difference between the first oscillation signal and the second oscillation signal and determines a mass flow rate from the oscillation signal phase difference. The Coriolis mass flowmeter according to the invention achieves the object derived at the beginning corresponding to the method presented in that the control and evaluation unit is designed in such a way that, by means of a first measuring channel pair with a first measuring channel phase difference from the oscillation signals by channel switching, analog/digital conversion, phase detection, digital low-pass filtering with downsampling effected thereby with a first conversion factor and averaging, error-free oscillation signal phase differences are calculated without contained phase errors due to an averaged-out first measuring channel phase difference, that, by means of a second measuring channel pair with a second measuring channel phase difference from the oscillation signals by analog/digital conversion, phase detection, digital low-pass filtering with downsampling effected thereby with a second conversion factor and averaging, averaged error-containing oscillation signal phase differences with contained phase error in the form of the second measuring channel phase difference are calculated, that, by means of a third measuring channel pair with negligible measuring channel phase difference, the oscillation signal phase positions of the second measuring channel pair measured after the phase detection in the second measuring channel pair are captured and either by continuous low-pass filtering without downsampling or by low-pass filtering with downsampling with a third conversion factor, wherein the third conversion factor is smaller or larger than the first conversion factor and the second conversion factor, error-containing oscillation signal phase differences with included phase error are determined on the basis of the second measuring channel phase difference, that, by difference formation from the averaged error-containing oscillation signal phase differences with contained phase error of the second measuring channel pair and the error-free oscillation signal phase differences without contained phase error of the first measuring channel pair, the second measuring channel phase difference is determined and that the determined second measuring channel phase difference is subtracted from the error-containing oscillation signal phase differences of the third measuring channel pair and thus error-free oscillation signal phase differences without contained phase error are obtained and are used as a basis for determining the mass flow rate.

Of course, the aforementioned Coriolis mass flowmeter is further designed such that, with its control and evaluation unit, it can carry out the aforementioned method in one or more of its variations during operation of the Coriolis mass flowmeter. Here the entire relevant signal processing is counted to the control and evaluation unit if necessary except the separately mentioned components.

BRIEF DESCRIPTION OF THE DRAWINGS

In detail, there are now various possibilities for designing and further developing the method according to the invention for operating a Coriolis mass flowmeter and the corresponding Coriolis mass flowmeter. For this, reference is made to the following description of preferred embodiments in connection with the drawings.

DETAILED DESCRIPTION

Figure 1:
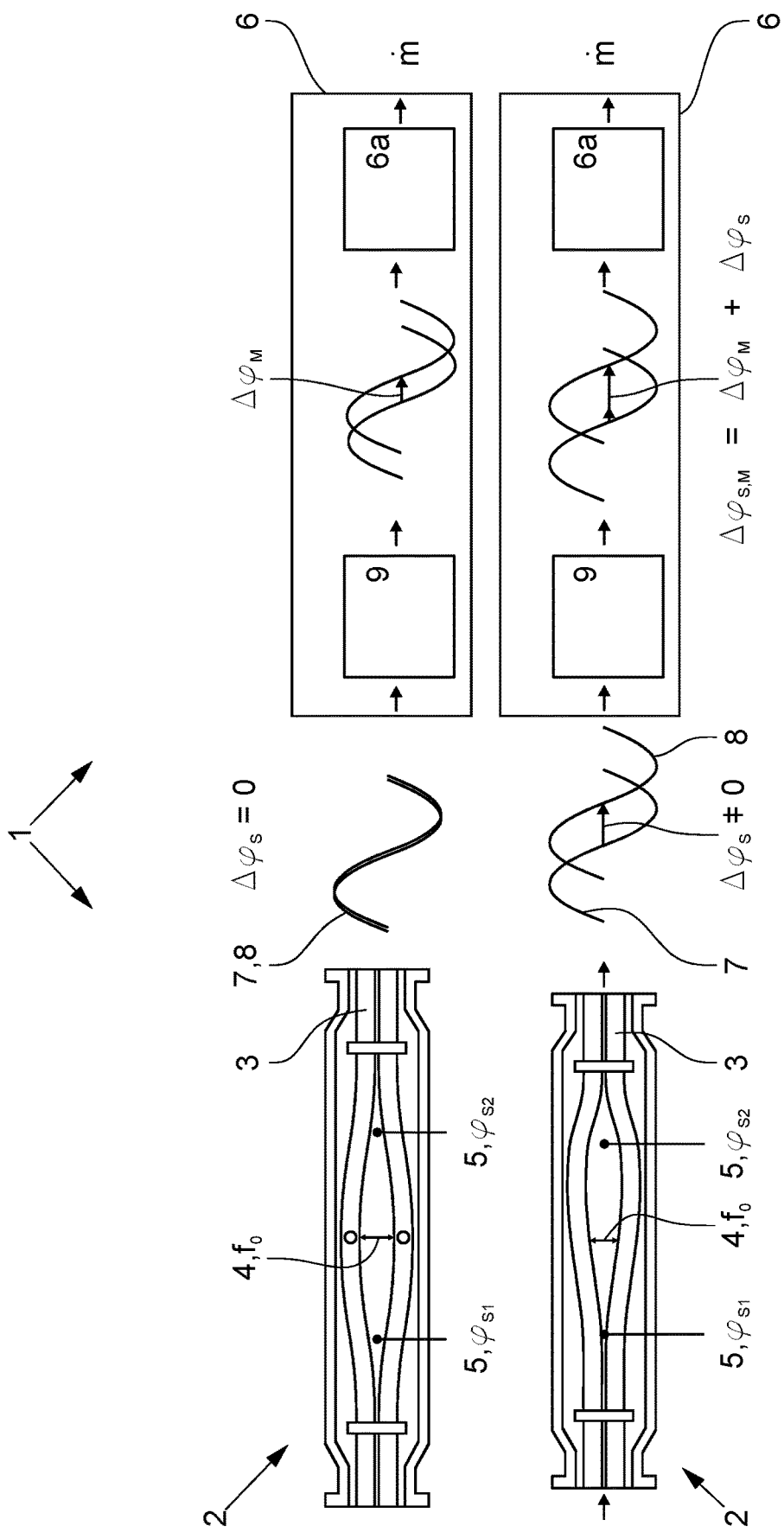
FIG. 1 schematically illustrates the basic problem of processing oscillation signals from Coriolis mass flowmeters in the presence of a measuring channel phase difference.
Figure 2:
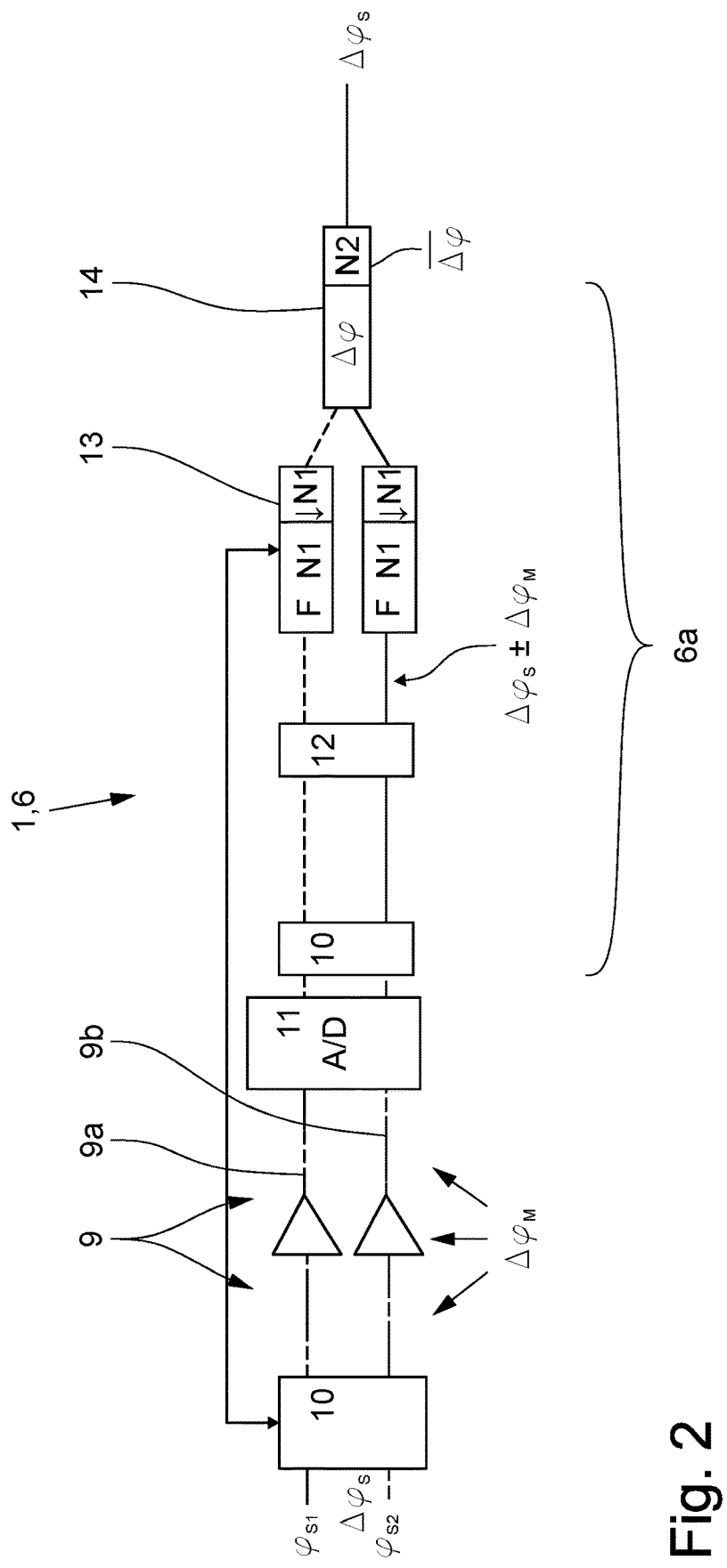
FIG. 2 schematically illustrates a prior art method and Coriolis mass flowmeter for avoiding the influence of measuring channel phase differences.
Figure 3:
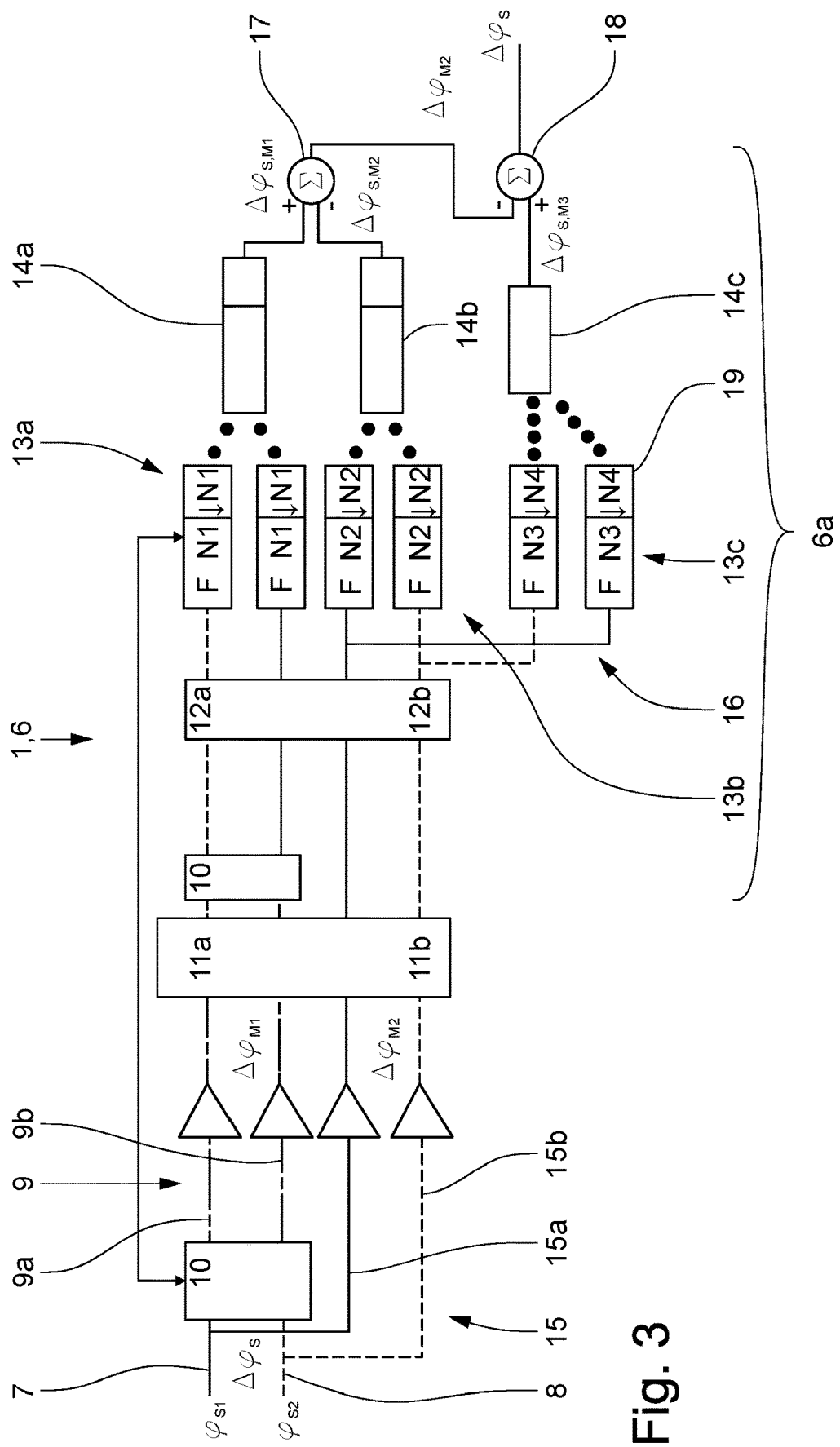
FIG. 3 schematically illustrates a method and Coriolis mass flowmeter according to the invention for avoiding the influence of measuring channel phase differences.

FIGS. 1 to 3 each show schematically a method 1 for operating a Coriolis mass flowmeter 2 and, at least in part with relevant components, also a corresponding Coriolis mass flowmeter 2 which is operated according to the method. Everything that is stated below with respect to the method 1 is to be equally related to the corresponding Coriolis mass flowmeter 1 that is operated according to the method, and vice versa.

The left side of FIG. 1 schematically shows the mechanical construction of a Coriolis mass flowmeter 2 with two measuring tubes 3, an implied oscillation generator 4, two implied oscillation sensors 5 and with a control and evaluation unit 6, which, however, is shown on the right side of FIG. 1.

A medium flows through the measuring tubes 3 in the measuring mode, wherein the oscillation generator 4 excites the measuring tubes in opposite directions perpendicular to the direction of flow and thus to the direction of extension of the measuring tubes 3 for the purpose of maintaining the center of mass to an oscillation with an excitation frequency $f_0$. The first and second oscillation sensors 5 capture the oscillations of the measuring tube 3 on the inlet side and outlet side and provide them as a first oscillation signal 7 with a first oscillation signal phase position $\varphi_{S1}$ and as a second oscillation signal 8 with a second oscillation signal phase position $\varphi_{S2}$. The control and evaluation unit 6 ideally determines the oscillation signal phase difference $\Delta\varphi_S$ between the first oscillation signal 7 and the second oscillation signal 8 without error and determines a mass flow rate from the oscillation signal phase difference $\Delta\varphi_S$.

With an ideal mechanical design of the Coriolis mass flowmeter 2, the oscillation signal phase difference $\Delta\varphi_S$ is zero ($\Delta\varphi_S=0$) for measuring tubes 3 with no flow and non-zero ($\Delta\varphi_S$ not equal to 0) for measuring tubes with flow and proportional to the mass flow of the medium. The former case is shown at the top of FIG. 1, the latter case at the bottom of FIG. 1. As already explained in the general description section, signal processing in the control and evaluation unit 6 of the first and second oscillation signals 7, 8 has an unintended, parasitic influence on the phase position of the first and second oscillation signals 7, 8 with respect to each other. In the illustrated embodiment, the oscillation signals 7 and 8 are fed via an analog measuring channel pair 9 to a signal processing area 6a of the control and evaluation unit 6, which is implemented digitally here. On their way, the oscillation signals 7, 8 are provided with a parasitic measuring channel phase difference $\Delta\varphi_M$. The resulting oscillation signal phase difference $\Delta\varphi_{S,M}$ is consequently different and distorted from the error-free oscillation signal phase difference $\Delta\varphi_S$. This inevitably results in a measurement error in the mass flow (m point). Calibration cannot permanently counteract this measurement error, since the measuring channel phase difference can be time- and temperature-dependent, for example.

FIG. 2 shows a known method for counteracting the phase error inherent in the measuring channel pair 9 with its first measuring channel 9a and its second measuring channel 9b in the form of the measuring channel phase difference $\Delta\varphi_M$. The solution here provides that by means of a measuring channel pair 9 with the measuring channel phase difference $\Delta\varphi_M$, error-free oscillation signal phase differences $\Delta\varphi_S$ without contained phase errors are calculated from the oscillation signals 7, 8 by means of channel switching 10, analog/digital conversion 11, phase detection 12, digital low-pass filtering 13 with downsampling thereby effected with a conversion factor N1 and averaging 14 based on averaged-out measuring channel phase difference $\Delta\varphi_M$. The idea here lies essentially in channel switching, whereby the first oscillation signal 7 and the second oscillation signal 8 are fed alternately via the first measuring channel 9a and then via the second measuring channel 9b of the measuring channel pair 9, whereby the measuring channel phase difference $\Delta\varphi_M$ acts with alternating sign on the oscillation signal phase difference and can thus finally be averaged out. The procedure leads to disturbances in the switching times of the channel switch and the countermeasures—filtering synchronous with the switching, smoothing, averaging—lead to a reduction in the measurement data rate at the output of the control and evaluation unit 6 and thus of the Coriolis mass flowmeter 2. Furthermore, the frequency of channel switching 10 and thus the number of captured measurement values at a given sampling rate of the analog/digital conversion 11 has a direct influence on the design of the digital low-pass filtering 13, in particular on the length of the low-pass filter 13 and thus also on the rate at which measurement data, i.e. flow measurement values, can be output. This general dependence is limiting for the design and use of the method 1 and the Coriolis mass flowmeter 2.

With the method 1 shown in FIG. 3 and Coriolis mass flowmeter 2 operated according to the method, these disadvantages can be avoided, despite compensation of the measuring channel phase difference by channel switching, and in particular higher measuring data rates can be achieved without violating boundary conditions (especially Nyquist) of the sampling system.

The method 1 shown in FIG. 3 is described by a schematically illustrated electronic circuit which is part of a Coriolis mass flowmeter 2, and which by its nature has an inherent signal flow, here in the form of several measuring channels 9, 15, 16. In FIG. 3, various designators are used in the manner of formula symbols, which make it easier to follow the present description. In strictness, a different designator would have to be used after each step of the signal processing, since, for example, an amplified oscillation signal after an amplifier is of course not identical with the unamplified oscillation signal before the corresponding amplifier. For purposes of clarity, this has not been implemented strictly here; nor is it necessary for understanding. FIG. 3 is to be read and understood accordingly. The designators are not necessary for clear understanding of the patent claims, but they facilitate understanding; to this extent, the designators in the patent claims have been placed in brackets like reference signs.

The method 1 and thus the Coriolis mass flowmeter 2 operating according to the method are characterized initially in that, by means of a first measuring channel pair 9 with a first measuring channel phase difference $\Delta\varphi_{M1}$ from the oscillation signals 7, 8 by channel switching 10, analog/digital conversion 11a, phase detection 12a, digital low-pass filtering 13a with downsampling effected thereby with a first conversion factor N1 and averaging 14a, error-free oscillation signal phase differences $\Delta\varphi_{S,M1}$ are calculated without contained phase errors due to averaged out first measuring channel phase difference $\Delta\varphi_{M1}$. The implementation of the first measuring channel 9 is therefore known. Thus, the oscillation signal phase difference $\Delta\varphi_S$ between the first oscillation signal 7 with the first oscillation signal phase position $\varphi_{S1}$ and the second oscillation signal 8 with the second oscillation signal phase position $\varphi_{S2}$ differ by the undistorted oscillation signal phase difference $\Delta\varphi_S$ that is actually of interest. As in the prior art, the oscillation signal phase difference $\Delta\varphi_S$ is distorted by the measuring channel phase difference $\Delta\varphi_{M1}$ when passing through in particular the analog part of the first measuring channel pair 9 (left side of FIG. 3). The circuit part following the analog/digital converter 11 or 11a is implemented digitally, for example by a programmed digital signal processor. Consequently, there are sampled values with a defined time stamp, so that further time drift between the digital values is no longer possible due to the principle; for this reason, the measuring channel phase difference has been noted in the area of the analog circuit part. The downsampling caused by the digital low-pass filtering means that the data rate at which the—error-free—oscillation signal phase difference $\Delta\varphi_{S,M1}$ can be provided at the output of the first measuring channel pair may be considerably lower than the data rate corresponding to the sampling frequency of the analog/digital converter 11a in the first measuring channel pair 9.

For the sake of completeness, it should be mentioned that the phase detection 12 or 12a is carried out here by I/Q demodulation, which is appropriate due to the harmonic character of the oscillation signals and the known frequency of the oscillation signals.

By means of a second measuring channel pair 15 with a second measuring channel phase difference $\Delta\varphi_{M2}$ from the oscillation signals 7, 8 by analog/digital conversion 11b, phase detection 12b, digital low-pass filtering 13b with downsampling effected thereby with a second conversion factor N2 and averaging 14b, error-averaged oscillation signal phase differences $\Delta\varphi_{S,M2}$ with contained phase error in the form of the second measuring channel phase difference $\Delta\varphi_{M2}$ are calculated. The error here consists of the measuring channel phase difference $\Delta\varphi_{M2}$ of the second measuring channel pair 15, since no measures—such as channel switching 10 in the first measuring channel pair 9—have been taken to eliminate the measuring channel phase difference $\Delta\varphi_{M2}$.

By means of a third measuring channel pair 16 with negligible measuring channel phase difference, the oscillation signal phase positions of the second measuring channel pair 15 measured after phase detection 12b in the second measuring channel pair 15 are captured and low-pass filtered either by continuous low-pass filtering 13c without downsampling or by low-pass filtering 13c with downsampling with a third conversion factor N3, wherein the third conversion factor is smaller or larger than the first conversion factor N1 and the second conversion factor N2, and then error-containing oscillation signal phase differences $\Delta\varphi_{S,M3}$ with included phase error are determined based on the second measuring channel phase difference $\Delta\varphi_{M2}$. In fact, it is important here that by the specified choice of the third conversion factor N3 in relation to the other two conversion factors N1 and N2, it is achieved that the third measuring channel pair 16 can and does output error-containing oscillation signal phase differences $\Delta\varphi_{S,M3}$ at a larger data rate at its output in the case of a smaller chosen third conversion factor N3 than data is output at the outputs of the first measuring channel pair 9 and the second measuring channel pair 15. If the third conversion factor N3 is selected to be larger than the first conversion factor N1 and the second conversion factor N2, unsteady measured quantities can be smoothed better at the cost of a longer response time and a lower rate at which measured data is output. The third conversion factor N3 can also be switched during measurement operation. In particular, the third conversion factor N3 can be selected independently. In the embodiment shown, the measuring channel phase difference is practically zero, since the third measuring channel pair is implemented exclusively in the digital area 6a of the control and evaluation circuit 6.

By difference formation 17 from the averaged error-containing oscillation signal phase differences $\Delta\varphi_{S,M2}$ with contained phase error of the second measuring channel pair 15 and the error-free oscillation signal phase differences $\Delta\varphi_{S,M1}$ without contained phase error of the first measuring channel pair 9, the second measuring channel phase difference $\Delta\varphi_{M2}$ is determined. Since the third conversion factor N3 in the illustrated embodiment example is chosen to be smaller than the first conversion factor N1 and the second conversion factor N2, this is also done slowly—in comparison—in relation to the output data rate of the third measuring channel pair 16, but this is not important since the parasitic measuring channel phase differences change only relatively slowly with respect to possible flow changes.

Finally, the determined second measuring channel phase difference $\Delta\varphi_{M2}$ is subtracted 18 from the error-containing oscillation signal phase differences $\Delta\varphi_{S,M3}$ of the third measuring channel pair 16 and thus error-free oscillation signal phase differences $\Delta\varphi_S$ without contained phase errors are obtained and are used as a basis for determining the mass flow rate.

As a result, the second measuring channel phase difference $\Delta\varphi_{M2}$ of the second measuring channel pair 15 is determined with a relatively low data rate, and error-free oscillation signal phase differences of the second measuring channel pair 15 are determined with a relatively fast data rate using the third measuring channel pair 16 ($\Delta\varphi_{S,M3}=\Delta\varphi_S+\Delta\varphi_{M2}$). By subtracting 18 these quantities, error-corrected oscillation signal phase differences $\Delta\varphi_S$ are output at a relatively high data rate, which are used as the basis for the mass flow calculation, which can then also be carried out at a relatively high data rate. In FIGS. 2 and 3, the same formula symbols have been used for the input-side oscillation signal phase difference at the input of the signal processing section and for the error-corrected oscillation signal phase difference at the output of the signal processing section, namely $\Delta\varphi_S$, in order to make it clear that, within the scope of the error sources only considered here, the unaltered input signal is obtained again on the output side by the method 1.

The embodiments of the various pairs of measuring channels 9, 15, 16 and thus of the associated embodiments of the method 1 are described in somewhat more detail below.

The determination of the error-free oscillation signal phase differences $\Delta\varphi_{M1}$ by means of the first measuring channel pair 9 is implemented in such a way that the oscillation signals 7, 8 are processed by means of the first measuring channel pair 9 having a first measuring channel 9a and a second measuring channel 9b and having a first measuring channel phase difference $\Delta\varphi_{M1}$ between the first measuring channel 9a and the second measuring channel 9b, wherein the first oscillation signal 7 and the second oscillation signal 8 in the first measuring channel pair 9 are routed on the input side alternately via the first measuring channel 9a and the second measuring channel 9b by means of a first channel switch 10 (multiplexer), the oscillation signals 7, 8 are either sampled downstream of the first channel changeover switch 10 by at least one analog/digital converter 11a at a first sampling rate and the sampled oscillation signals are fed back to their original measuring channel 9a, 9b, or the oscillation signals are routed to their original measuring channel 9a, 9b after the first channel switch 10 (multiplexer) with a second channel switch 10 (demultiplexer) and then sampled by an analog/digital converter 11a at a first sampling rate. The channel switch 10 thus comprises two parts here, namely a multiplexer and a demultiplexer as seen in the direction of signal travel, wherein in the specific embodiment the multiplexer actually physically performs a switchover of the signals between the two measuring channels. The function of the demultiplexer is solved here by using software, alternately accessing different memory cells in which the data from the two measuring channels have been stored after the analog/digital conversion.

A phase detector 12a is used to determine first measured oscillation signal phase positions from the sampled first oscillation signals, and to determine second measured oscillation signal phase positions from the sampled second oscillation signals. From a plurality of the first and second measured oscillation signal phase positions obtained in a respective position of the channel changeover switches 10, a low-pass filtered first oscillation signal phase position and a low-pass filtered second oscillation signal phase position are determined by a digital filter 13a having a low-pass characteristic, so that downsampling is thus effected with the first conversion factor N1 in the first measuring channel pair 9. From temporally corresponding low-pass-filtered oscillation signal phase positions, in each case in one position of the channel changeover switch 10, corresponding error-containing oscillation signal phase differences with contained phase error are determined on the basis of the first measuring channel phase difference $\Delta\varphi_{M1}$. By averaging, error-free oscillation signal phase differences $\Delta\varphi_{SM,1}$ without contained phase error are calculated from several error-containing oscillation signal phase differences with contained phase error.

Furthermore, it can be seen in FIG. 3 that the determination of the averaged error-containing oscillation signal phase differences $\Delta\varphi_{S,M2}$ by means of the second measuring channel pair 15 is implemented in that the oscillation signals 7, 8 are processed by means of the second measuring channel pair 15 with a first measuring channel 15a and a second measuring channel 15b and with a second measuring channel phase difference $\Delta\varphi_{M2}$ between the first measuring channel 15a and the second measuring channel 15b, wherein the first oscillation signal 7 and the second oscillation signal 8 are sampled by an analog/digital converter 11b at a first sampling rate and first measured oscillation signal phase positions are determined from the sampled first oscillation signals by a phase detector 12b. Second measured oscillation signal phase positions are determined from the sampled second oscillation signals. From a plurality of the first and second measured oscillation signal phase positions obtained during a position of the channel switches 10 of the first measuring channel pair 9 in the second measuring channel pair 15, a low-pass filtered first oscillation signal phase position and a low-pass filtered second oscillation signal phase position are determined by a digital filter 13b having a low-pass characteristic, so that downsampling with the second conversion factor N2 is thus effected in the second measuring channel pair 9. From temporally corresponding low-pass-filtered oscillation signal phase positions, corresponding error-containing oscillation signal phase differences with contained phase error are determined on the basis of the second measuring channel phase difference $\Delta\varphi_{M2}$. By averaging 14b, averaged error-containing oscillation signal phase differences $\Delta\varphi_{S,M2}$, with included phase error are calculated from a plurality of error-containing oscillation signal phase differences with included phase error based on the second measuring channel phase difference $\Delta\varphi_{M2}$.

Finally, for the third measuring channel pair 16, the determination of the error-containing oscillation signal phase differences $\Delta\varphi_{S,M3}$ is implemented such, that—by means of the third measuring channel pair 16 with negligible measuring channel phase difference from the first measured oscillation signal phase positions of the second measuring channel pair 15 and from the second measured oscillation signal phase positions of the second measuring channel pair 15—either low-pass filtered first oscillation signal phase positions and low-pass filtered second oscillation signal phase positions are determined by means of a continuous digital filter 13c with low-pass characteristic, without downsampling being effected in the third measuring channel, or low-pass-filtered first oscillation signal phase positions and low-pass-filtered second oscillation signal phase positions are determined by low-pass filtering 13c with downsampling with a third conversion factor N3, wherein the third conversion factor N3 is smaller or larger than the first conversion factor N1 and the second conversion factor N2, and, from temporally corresponding low-pass-filtered oscillation signal phase positions, corresponding error-containing oscillation signal phase differences $\Delta\varphi_{S,M3}$ with contained phase error are determined on the basis of the second measuring channel phase difference $\Delta\varphi_{M2}$.

In the embodiment according to FIG. 3, it is provided that the switching frequency of the channel switch 10 (multiplexer and demultiplexer) of the first measuring channel pair 9 and the excitation frequency $f_0$ of the oscillation generator 4 are coordinated with each other in such a way that a plurality of measuring tube oscillations are captured during the duration of one position of the channel switch 10, namely 10 measuring tube oscillations are captured in the present case.

Furthermore, in the embodiment according to FIG. 3, it is implemented that the switching frequency of the channel switch 10 of the first measuring channel pair 9, the sampling rate of the analog/digital converter 11a of the first measuring channel pair 9 and the analog/digital converter 11b of the second measuring channel pair 15 and the length of the digital filter 13a with low-pass characteristics of the first measuring channel pair 9 and the length of the digital filter 13b of the second measuring channel pair 15 are matched to each other in such a way that the digital filters 13a, 13b are substantially completely filled with samples of one position of the channel switch 10.

Furthermore, it is implemented that samples of the analog/digital converters 11a, 11b of the first measuring channel pair 9 and/or of the second measuring channel pair 15 are not used in the digital filters 13a, 13b with low-pass characteristics of the first measuring channel pair 9 and of the second measuring channel pair 15 in the range of the switching times of the channel switch 10. More precisely, it is provided that samples of the analog/digital converters 11a, 11b of the first measuring channel pair 9 and the second measuring channel pair 15 are replaced by zeros in the range of the switching instants of the channel switch 10 in the digital filters 11a, 11b with low-pass characteristics of the first measuring channel pair 9 and the second measuring channel pair 15.

Furthermore, the first conversion factor N1 and the second conversion factor N2 are chosen to be the same, resulting in equal downsampling in both measuring channel pairs 9, 15.

Furthermore, a further digital filter 19 is downstream of the digital filters 13c with low-pass characteristic in the third measuring channel pair 16 for implementing a downsampling, wherein the downsampling with conversion factor N4 is selected in such a way that the subsequent calculation of the error-containing oscillation signal phase differences $\Delta\varphi_{S,M3}$ and the error-free oscillation signal phase differences $\Delta\varphi_S$ can be carried out with each pair of values of low-pass filtered oscillation signal phase positions provided after the downsampling; in this way, the hardware is optimally used.

In the illustrated embodiment, the digital filter 13a of the first measuring channel pair 9 with low-pass characteristic and the digital filter 13b of the second measuring channel pair 15 with low-pass characteristic are implemented as FIR filters (finite impulse response filter).

The invention claimed is:
1. A method for operating a Coriolis mass flowmeter, wherein the Coriolis mass flowmeter has at least one measuring tube, at least one oscillation generator, at least two oscillation sensors and at least one control and evaluation unit, wherein it is possible for a medium to flow through the measuring tube, wherein the oscillation generator excites the measuring tube into oscillation with an excitation frequency ($f_0$), wherein the first and the second oscillation sensors capture the oscillations of the measuring tube on the inlet side and on the outlet side and provide them as a first oscillation signal with a first oscillation signal phase position ($\varphi_{S1}$) and as a second oscillation signal with a second oscillation signal phase position ($\varphi_{S2}$), wherein the control and evaluation unit determines an oscillation signal phase difference ($\Delta\varphi_S$) between the first oscillation signal and the second oscillation signal and determines a mass flow rate from the oscillation signal phase difference ($\Delta\varphi_S$), the method comprising:

calculating error-free oscillation signal phase differences ($\Delta\varphi_{S,M1}$) using a first measuring channel pair with a first measuring channel phase difference ($\Delta\varphi_{M1}$) from the oscillation signals by channel switching, analog/digital conversion, phase detection, digital low-pass filtering with downsampling effected thereby with a first conversion factor and averaging, wherein the error-free oscillation signal phase differences ($\Delta\varphi_{S,M1}$) are calculated without contained phase errors due to an averaged-out first measuring channel phase difference ($\Delta\varphi_{M1}$);

calculating averaged error-containing oscillation signal phase differences ($\Delta\varphi_{S,M2}$) using a second measuring channel pair with a second measuring channel phase difference ($\Delta\varphi_{M2}$) from the oscillation signals by analog/digital conversion, phase detection, digital low-pass filtering with downsampling effected thereby with a second conversion factor and averaging, wherein the averaged error-containing oscillation signal phase differences ($\Delta\varphi_{S,M2}$) contains phase error in the form of the second measuring channel phase difference ($\Delta\varphi_{M2}$);

determining error-containing oscillation signal phase differences ($\Delta\varphi_{S,M3}$) with included phase error using a third measuring channel pair with negligible measuring channel phase difference, the oscillation signal phase positions of the second measuring channel pair measured after the phase detection in the second measuring channel pair are captured and either by continuous low-pass filtering without downsampling or by low-pass filtering with downsampling with a third conversion factor, wherein the third conversion factor is smaller or larger than the first conversion factor and the second conversion factor, wherein the error-containing oscillation signal phase differences ($\Delta\varphi_{S,M3}$) with included phase error are determined on the basis of the second measuring channel phase difference ($\Delta\varphi_{M2}$);

determining the second measuring channel phase difference ($\Delta\varphi_{M2}$) by difference formation from the averaged error-containing oscillation signal phase differences ($\Delta\varphi_{S,M2}$) with contained phase error of the second measuring channel pair and the error-free oscillation signal phase differences ($\Delta\varphi_{S,M1}$) without contained phase error of the first measuring channel pair;

obtaining error-free oscillation signal phase differences ($\Delta\varphi_S$) without contained phase error by subtractng the determined second measuring channel phase difference ($\Delta\varphi_{M2}$) from the error-containing oscillation signal phase differences ($\Delta\varphi_{S,M3}$) of the third measuring channel pair; and using the error-free oscillation signal phase differences ($\Delta\varphi_S$) without contained phase error as a basis for determining the mass flow rate.

2. The method according to claim 1, wherein the determination of the error-free oscillation signal phase differences ($\Delta\varphi_{M1}$) using the first measuring channel pair is implemented in such a way that the oscillation signals are processed using the first measuring channel pair with a first measuring channel and a second measuring channel and with a first measuring channel phase difference ($\Delta\varphi_{M1}$) between the first measuring channel and the second measuring channel, wherein the first oscillation signal and the second oscillation signal in the first measuring channel pair are routed on the input side alternately via the first measuring channel and the second measuring channel using a first channel switch, the oscillation signals are either sampled downstream of the channel switch by at least one analog/digital converter at a first sampling rate and the sampled oscillation signals are fed back to their original measuring channel or the oscillation signals after the channel switch are fed to their original measuring channel using a second channel switch and are then sampled by at least one analog/digital converter at a first sampling rate, and first measured oscillation signal phase positions are determined from the sampled first oscillation signals using at least one phase detector and second measured oscillation signal phase positions are determined from the sampled second oscillation signals, a low-pass filtered first oscillation signal phase position and a low-pass filtered second oscillation signal phase position are determined from a plurality of the first and second measured oscillation signal phase positions obtained in a respective position of the channel switches using at least one digital filter with low-pass characteristic, so that a downsampling with the first conversion factor is effected in the first measuring channel pair, and, from temporally corresponding low-pass-filtered oscillation signal phase positions in each case in one position of the channel switch, corresponding error-containing oscillation signal phase differences with contained phase error are determined on the basis of the first measuring channel phase difference ($\Delta\varphi_{M1}$) and error-free oscillation signal phase differences ($\Delta\varphi_{S,M1}$) without contained phase error are calculated by averaging from a plurality of error-containing oscillation signal phase differences with contained phase error.

3. The method according to claim 1, wherein the determination of the averaged error-containing oscillation signal phase differences ($\Delta\varphi_{S,M2}$) using the second measuring channel pair is implemented in that the oscillation signals are processed using the second measuring channel pair with a first measuring channel and a second measuring channel and with a second measuring channel phase difference ($\Delta\varphi_{M2}$) between the first measuring channel and the second measuring channel, wherein the first oscillation signal and the second oscillation signal are sampled by at least one analog/digital converter at a first sampling rate and first measured oscillation signal phase positions are determined from the sampled first oscillation signals by at least one phase detector and second measured oscillation signal phase positions are determined from the sampled second oscillation signals, a low-pass filtered first oscillation signal phase position and a low-pass filtered second oscillation signal phase position are determined from a plurality of the first and second measured oscillation signal phase positions obtained in the second measuring channel pair during setting of the channel switches of the first measuring channel pair by means of at least one digital filter having a low-pass characteristic, so that downsampling is thus effected with the second conversion factor in the second measuring channel pair and corresponding error-containing oscillation signal phase differences with contained phase error are determined from temporally corresponding low-pass-filtered oscillation signal phase positions on the basis of the second measuring channel phase difference ($\Delta\varphi_{M2}$), and averaged error-containing oscillation signal phase differences ($\Delta\varphi_{S,M2}$) with included phase error based on the second measuring channel phase difference ($\Delta\varphi_{M2}$) can be calculated by averaging a plurality of error-containing oscillation signal phase differences with contained phase error.

4. The method according to claim 1, wherein the determination of the error-containing oscillation signal phase differences ($\Delta\varphi_{S,M3}$) using the third measuring channel pair is implemented in such a way that, using the third measuring channel pair with negligible measuring channel phase difference from the first measured oscillation signal phase positions of the second measuring channel pair and from the second measured oscillation signal phase positions of the second measuring channel pair, either low-pass filtered first oscillation signal phase positions and low-pass filtered second oscillation signal phase positions are determined using a continuous digital filter with low-pass characteristic, without downsampling being effected in the third measuring channel, or low-pass-filtered first oscillation signal phase positions and low-pass-filtered second oscillation signal phase positions are determined by low-pass filtering with downsampling with a third conversion factor, wherein the third conversion factor is smaller or larger than the first conversion factor and the second conversion factor, and, from temporally corresponding low-pass-filtered oscillation signal phase positions, corresponding error-containing oscillation signal phase differences ($\Delta\varphi_{S,M3}$) with contained phase error are determined on the basis of the second measuring channel phase difference ($\Delta\varphi_{M2}$).

5. The method according to claim 1, wherein the switch frequency of the channel switch of the first measuring channel pair and the excitation frequency ($f_0$) of the oscillation generator are matched to one another in such a way that during the duration of one position of the channel switch at least one measuring tube oscillation is captured.

6. The method according to claim 1, wherein the switching frequency of the channel switch of the first measuring channel pair, the sampling rate of the analog/digital converter of the first measuring channel pair and/or of the analog/digital converter of the second measuring channel pair and the length of the digital filter with low-pass characteristics of the first measuring channel pair and/or of the digital filter of the second measuring channel pair are matched to one another in such a way that the digital filter is substantially completely filled with samples of a position of the channel switch.

7. The method according to claim 6, wherein the sampled values of the analog/digital converters of the first measuring channel pair and/or of the second measuring channel pair in the range of the switching times of the channel switch are not used in the digital filters with low-pass characteristics of the first measuring channel pair and/or of the second measuring channel pair.

8. The method according to claim 6, wherein sampled values of the analog/digital converters of the first measuring channel pair and/or of the second measuring channel pair are replaced by zeros in the range of the switching times of the channel switch in the digital filters with low-pass characteristics of the first measuring channel pair and/or of the second measuring channel pair.

9. The method according to claim 1, wherein the digital filters with low-pass characteristics in the third measuring channel pair are followed by a further digital filter for implementing a downsampling;
wherein the downsampling with conversion factor is selected such that the subsequent calculation of the error-containing oscillation signal phase differences ($\Delta\varphi_{S,M3}$) and the error-free oscillation signal phase differences ($\Delta\varphi_S$) can be carried out with each pair of values of low-pass filtered oscillation signal phase positions provided after the downsampling.

10. The method according to claim 1, wherein the digital filter of the first measuring channel pair with low-pass characteristic and/or the digital filter of the second measuring channel pair with low-pass characteristic and/or the digital filter of the third measuring channel pair with low-pass characteristic are implemented as FIR filters (finite impulse response filters).

11. The method according to claim 1, wherein the first conversion factor and the second conversion factor are equal.

12. A Coriolis mass flowmeter, comprising:
at least one measuring tube;
at least one oscillation generator;
at least two oscillation sensors; and
at least one control and evaluation unit;
wherein it is possible for a medium to flow through the measuring tube;
wherein the oscillation generator excites the measuring tube into oscillation with an excitation frequency ($f_0$);
wherein the first and the second oscillation sensor capture the oscillations of the measuring tube on the inlet side and on the outlet side and provide them as a first oscillation signal with a first oscillation signal phase position ($\varphi_{S1}$) and as a second oscillation signal with a second oscillation signal phase position $\varphi_{S2}$, wherein the control and evaluation unit determines an oscillation signal phase difference ($\Delta\varphi_S$) between the first oscillation signal and the second oscillation signal and determines a mass flow rate from the oscillation signal phase difference ($\Delta\varphi_S$);
wherein the control and evaluation unit is designed to:
calculate error-free oscillation signal phase differences ($\Delta\varphi_{S,M1}$) using a first measuring channel pair with a first measuring channel phase difference ($\Delta\varphi_{M1}$) from the oscillation signals by channel switching, analog/digital conversion, phase detection, digital low-pass filtering with downsampling effected thereby with a first conversion factor and averaging, wherein the error-free oscillation signal phase differences ($\Delta\varphi_{S,M1}$) are calculated without contained phase errors due to an averaged-out first measuring channel phase difference ($\Delta\varphi_{M1}$);
calculate averaged error-containing oscillation signal phase differences ($\Delta\varphi_{S,M2}$) using a second measuring channel pair with a second measuring channel phase difference ($\Delta\varphi_{M2}$) from the oscillation signals by analog/digital conversion, phase detection, digital low-pass filtering with downsampling effected thereby with a second conversion factor and averaging, wherein the averaged error-containing oscillation signal phase differences ($\Delta\varphi_{S,M2}$) contains phase error in the form of the second measuring channel phase difference ($\Delta\varphi_{M2}$) are calculated;
determine error-containing oscillation signal phase differences ($\Delta\varphi_{S,M3}$) with included phase error using a third measuring channel pair with negligible measuring channel phase difference, the oscillation signal phase positions of the second measuring channel pair measured after the phase detection in the second measuring channel pair are captured and either by continuous low-pass filtering without downsampling or by low-pass filtering with downsampling with a third conversion factor, wherein the third conversion factor is smaller or larger than the first conversion factor and the second conversion factor, wherein the error-containing oscillation signal phase differences ($\Delta\varphi_{S,M3}$) with included phase error are determined on the basis of the second measuring channel phase difference ($\Delta\varphi_{M2}$);
determine the second measuring channel phase difference ($\Delta\varphi_{M2}$) by difference formation from the averaged error-containing oscillation signal phase differences ($\Delta\varphi_{S,M2}$) with contained phase error of the second measuring channel pair and the error-free oscillation signal phase differences ($\Delta\varphi_{S,M1}$) without contained phase error of the first measuring channel pair;
obtain error-free oscillation signal phase differences ($\Delta\varphi_S$) without contained phase error by substracting the determined second measuring channel phase difference ($\Delta\varphi_{M2}$) from the error-containing oscillation signal phase differences ($\Delta\varphi_{S,M3}$) of the third measuring channel pair; and
use the error-free oscillation signal phase differences ($\Delta\varphi_S$) without contained phase error as a basis for determining the mass flow rate.

13. The Coriolis mass flowmeter according to claim 12, wherein the control and evaluation unit is designed such that the determination of the error-containing oscillation signal phase differences ($\Delta_{\varphi S,M3}$) using the third measuring channel pair is implemented in such a way that, using the third measuring channel pair with negligible measuring channel phase difference from the first measured oscillation signal phase positions of the second measuring channel pair and from the second measured oscillation signal phase positions of the second measuring channel pair, either low-pass filtered first oscillation signal phase positions and low-pass filtered second oscillation signal phase positions are determined using a continuous digital filter with low-pass characteristic, without downsampling being effected in the third measuring channel, or low-pass-filtered first oscillation signal phase positions and low-pass-filtered second oscillation signal phase positions are determined by low-pass filtering with downsampling with a third conversion factor, wherein the third conversion factor is smaller or larger than the first conversion factor and the second conversion factor, and, from temporally corresponding low-pass-filtered oscillation signal phase positions, corresponding error containing oscillation signal phase differences ($\Delta_{\varphi S,M3}$) with contained phase error are determined on the basis of the second measuring channel phase difference ($\Delta_{\varphi M2}$).

14. The Coriolis mass flowmeter according to claim 12, wherein the switch frequency of the channel switch of the first measuring channel pair and the excitation frequency ($f_0$) of the oscillation generator are matched to one another in such a way that during the duration of one position of the channel switch at least one measuring tube oscillation is captured.

15. The Coriolis mass flowmeter according to claim 12, wherein the switching frequency of the channel switch of the first measuring channel pair, the sampling rate of the analog/digital converter of the first measuring channel pair and/or of the analog/digital converter of the second measuring channel pair and the length of the digital filter with low-pass characteristics of the first measuring channel pair and/or of the digital filter of the second measuring channel pair are matched to one another in such a way that the digital filter is substantially completely filled with samples of a position of the channel switch.

16. The Coriolis mass flowmeter according to claim 15, wherein the sampled values of the analog/digital converters of the first measuring channel pair and/or of the second measuring channel pair in the range of the switching times of the channel switch are not used in the digital filters with low-pass characteristics of the first measuring channel pair and/or of the second measuring channel pair.

17. The Coriolis mass flowmeter according to claim 15, wherein sampled values of the analog/digital converters of the first measuring channel pair and/or of the second measuring channel pair are replaced by zeros in the range of the switching times of the channel switch in the digital filters with low-pass characteristics of the first measuring channel pair and/or of the second measuring channel pair.

18. The Coriolis mass flowmeter according to claim 12, wherein the digital filters with low-pass characteristics in the third measuring channel pair are followed by a further digital filter for implementing a downsampling, wherein the downsampling with conversion factor is selected such that the subsequent calculation of the error-containing oscillation signal phase differences ($\Delta_{\varphi S,M3}$) and the error-free oscillation signal phase differences ($\Delta_{\varphi S}$) can be carried out with each pair of values of low-pass filtered oscillation signal phase positions provided after the downsampling.

19. The Coriolis mass flowmeter according to claim 12, wherein the digital filter of the first measuring channel pair with low-pass characteristic and/or the digital filter of the second measuring channel pair with low-pass characteristic and/or the digital filter of the third measuring channel pair with low-pass characteristic are implemented as FIR filters (finite impulse response filters).

20. The Coriolis mass flowmeter according to claim 12, wherein the first conversion factor and the second conversion factor are equal.

* * * * *